United States Patent [19]
Holopainen

[11] 4,155,473
[45] May 22, 1979

[54] MATERIAL HANDLING APPARATUS

[76] Inventor: Vaino J. Holopainen, Cross Rd., East Sullivan, N.H. 13445

[21] Appl. No.: 828,776

[22] Filed: Aug. 29, 1977

[51] Int. Cl.² ............................................. B66F 9/00
[52] U.S. Cl. .................................. 414/704; 414/722; 414/740
[58] Field of Search ............... 214/767, 145 R, 147 R, 214/653, 654

[56] References Cited
U.S. PATENT DOCUMENTS 3,273,729  9/1966  Holopainen ......................... 214/138
3,363,791  1/1968  Hansen ................................ 214/654
3,451,575  6/1969  Petro .................................... 214/767

Primary Examiner—Francis S. Husar
Assistant Examiner—George F. Abraham
Attorney, Agent, or Firm—Norman S. Blodgett; Gerry A. Blodgett

[57] ABSTRACT

Material handling apparatus, including a bucket and a clamp arm mounted on the bucket, the clamp arm being movable from an operative position, where it cooperates with the operative edge of the bucket in handling material, to a storage position where it is located outside of the bucket.

11 Claims, 6 Drawing Figures

MATERIAL HANDLING APPARATUS

BACKGROUND OF THE INVENTION

In construction and in public works operations, it is common practice to use an apparatus known as a "front end loader", consisting of a tractor on the front of which is mounted a large bucket which extends a considerable distance transversely of the front of the tractor. As the name implies, the loader is usually used to transfer dirt, stone, and loose material from the ground into a waiting truck for transfer to another location. While such apparatus has a wide range of functions in connection with material handling, nevertheless it is limited in the type of materials that it can handle. For instance, it is difficult with a front end loader to pick up a log and transfer it into a truck; this is because the log may be balanced on the bucket when it is close to the ground, but when the operator attempts to raise the bucket with the log on it, the log tends to roll off of the bucket either toward the tractor and the operator or away from it. Similarly, if the operator attempts to lift a bundle of brush, the bundle tends to fall apart in the process of raising it for loading into a truck, or in moving it in any way. The patent of Holopainen U.S. Pat. No. 3,273,729 shows a hydraulically-operated clamping arm that has been used in connection with a backhoe, the clamping arm being mounted on the boom. However, when one attempts to apply such an arm to a front end loader, it readily becomes apparent that there is no suitable location for the arm when it is not being used. Attempts in the past to apply clamping arms to front end loaders have been less than successful, particularly because the resulting apparatus has interfered with normal operation of the bucket, has been complicated and expensive, and has been subject to damage when the bucket is used in the conventional manner. These and other difficulties experienced with prior art devices have been obviated in a novel manner by the present invention.

It is, therefore, an outstanding object of the invention to provide material handling apparatus which extends the range of materials that can be handled by a front end loader.

Another object of the present invention is the provision of material handling apparatus, including a clamping arm mounted on a bucket for operation therewith.

A further object of the present invention is the provision of material handling apparatus having a clamping arm for use with a bucket, which apparatus is simply in construction, which is inexpensive to manufacture, and which is capable of a long life of useful service with a minimum of maintenance.

It is another object of the instant invention to provide material handling apparatus, including a bucket and a clamping arm, with means to store the clamping arm, so that it does not interfer with normal operation of the bucket when the clamping arm is not used.

A still further object of the invention is the provision of material handling apparatus, including hydraulic circuitry for operating a bucket and clamping arm in alternate modes.

It is a further object of the invention to provide material handling apparatus, including hydraulic circuitry for operating a clamping arm in conjunction with a bucket, which circuitry is capable of operating the clamping arm in the operative mode and in the storage mode.

SUMMARY OF THE INVENTION

In general, the invention consists of a material handling apparatus having a frame which is adapted to be mounted on a vehicle and having a bucket mounted on the frame, which bucket has an operating edge. Pivot means is provided to mount the bucket on the frame for pivotal movement about a first axis which is spaced from and parallel to the said operating edge. The clamp arm is mounted for swinging motion about a second axis which is also spaced from and parallel to the said operating edge. Means is provided that permits the clamping arm to be moved from an operative position to a storage position, the latter position being located along the outer surface of the bucket parallel to the said operating edge.

More specifically, hydraulic circuitry is provided to move the bucket about the said first axis and to rotate the clamp arm about the said second axis. The hydraulic circuitry provides for upward movement of the bucket about the first axis before the clamping arm moves downwardly toward the bucket about the second axis. It also provides that the clamping force increases with the load on the bucket and in direct proportion thereto.

The clamp arm is also swingable about a third axis which is perpendicular to the operating edge of the bucket. It is about this third axis that the clamp arm moves as it goes from its operating position to its storage position and back. In the preferred embodiment, a separate hydraulic cylinder is used for bringing about this last swinging movement.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
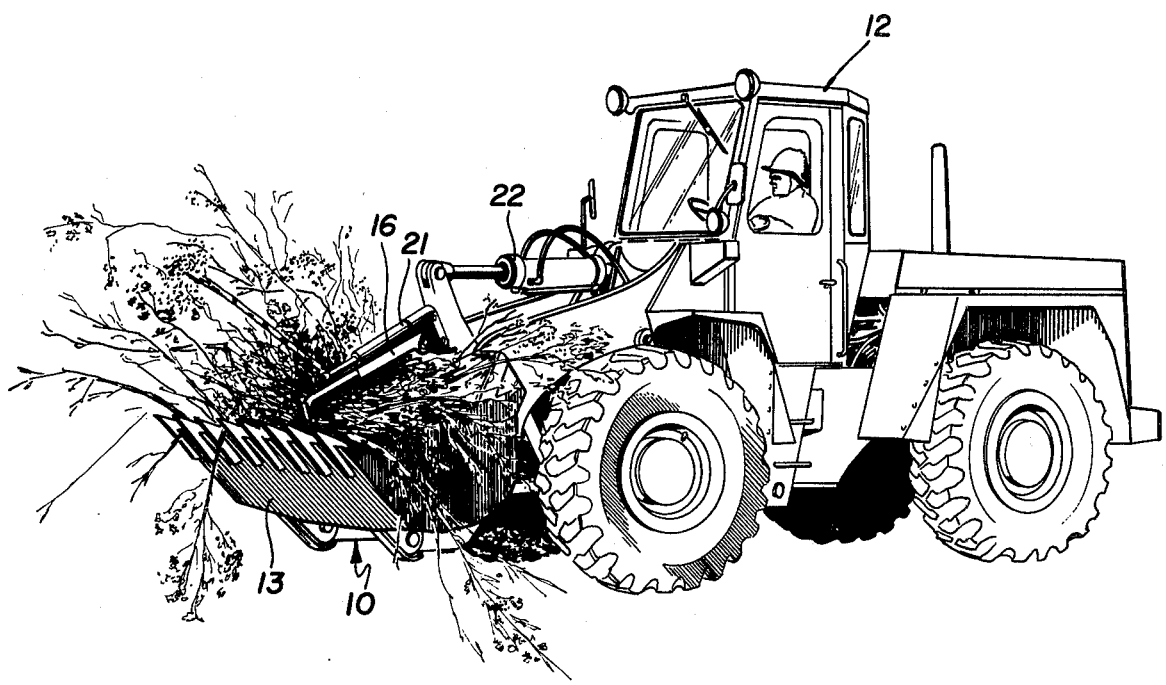
FIG. 1 is a perspective view of a material handling apparatus embodying the principles of the present invention.
Figure 5:
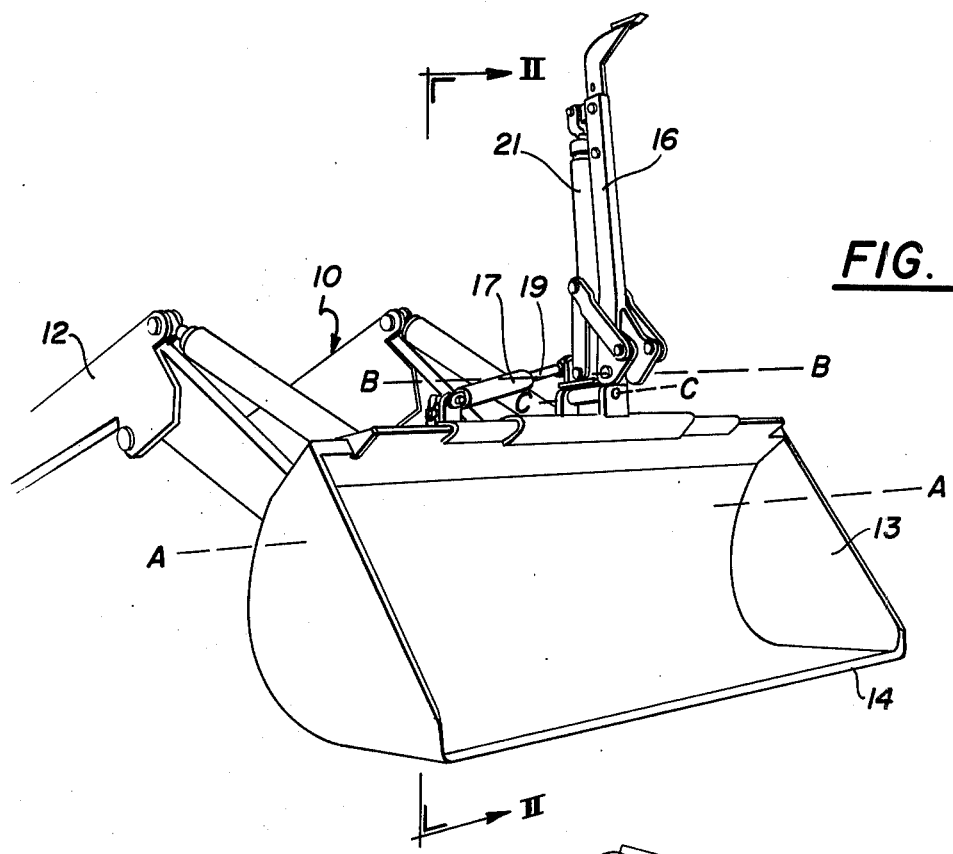
FIG. 5 is a front perspective view of the invention.
Figure 2:
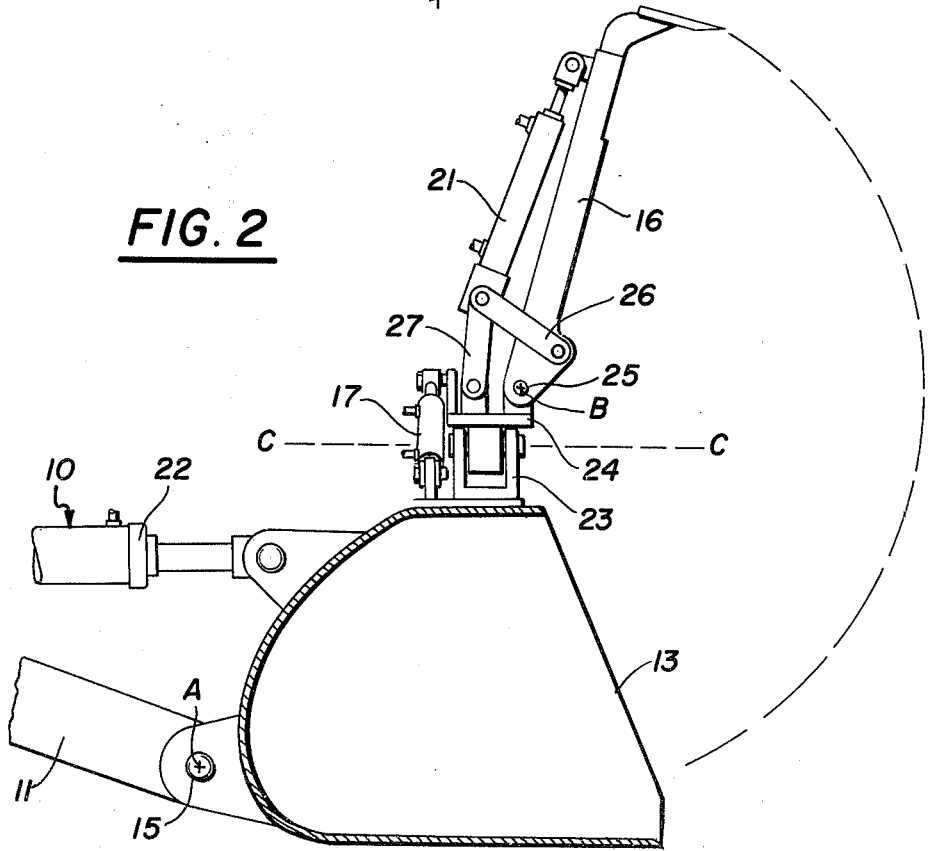
FIG. 2 is a vertical sectional view of the invention taken on the line II—II of FIG. 5.
Figure 3:
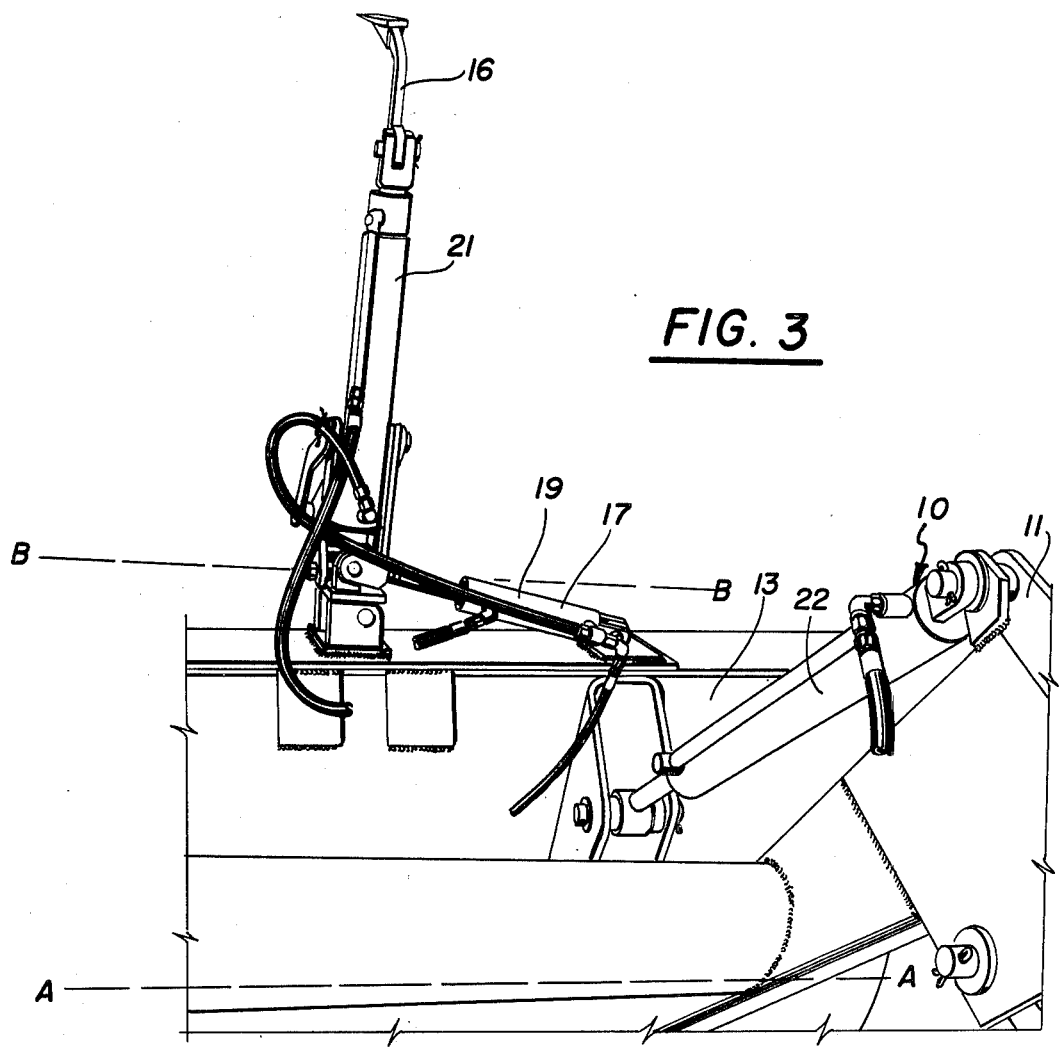
FIG. 3 is a rear elevational view of the apparatus.
Figure 4:
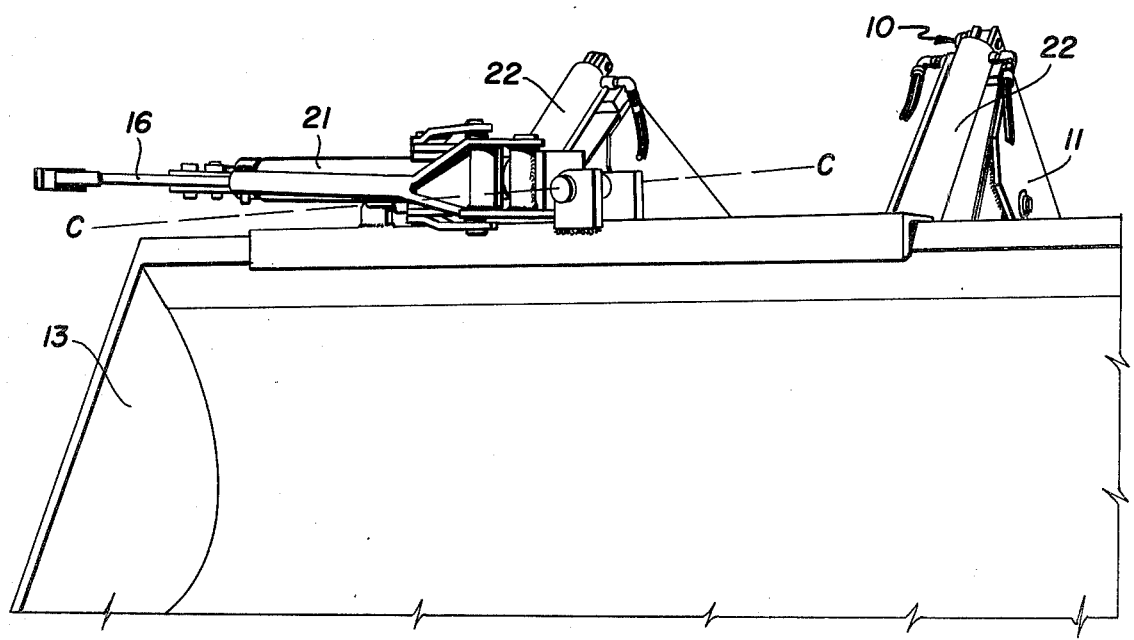
FIG. 4 is a front elevational view of the apparatus.

Referring first to FIG. 1, wherein are best shown the general features of the invention, the material handling apparatus, indicated generally by the reference numeral 10, is shown in use on a vehicle 12 such as an industrial tractor.

As is shown in FIGS. 2–5, the apparatus is provided with a frame 11 which is mouted on the vehicle 12 and a bucket 13 which is mounted on the frame by means of a pivot pin 15 to permit vertical swinging motion of the bucket about a first axis A—A which is parallel to the operating edge 14 of the bucket. An elongated clamp arm 16 is mounted on the upper portion of the bucket for swinging motion about a second axis B—B which is spaced from and parallel to the operating edge of the bucket and is located adjacent the upper edge of the bucket. A storage means, designated generally by the reference numeral 17, is provided to move the clamp arm 16 from an operating postion shown in FIG. 1

(where it is generally vertical) to a storage position (where it lies along the outer surface of the bucket). In the storage position it is generally horizontal and parallel to the operating edge 14 of the bucket.

The storage means 17 also serves to move the clamp arm 16 in the reversed direction from its storage position into its operating position. In the preferred embodiment, the storage means consists of a hydraulic cylinder 19 and a pivotal attachment between the operating arm and the bucket that permits swinging motion of the clamp arm about a third axis C—C which extends longitudinally of the vehicle and is at a right angle to the other two axes A—A and B—B.

As has been stated, the storage means 17 includes a first hydraulic storage cylinder 19. A second hydraulic clamping cylinder 21 causes the clamp arm 16 (when in its operative position) to swing about the second axis B—B. A third hydraulic bucket cylinder 22 connects the frame to the bucket to cause the bucket to rotate about the first axis A—A.

In order to mount the clamp arm 16 on the bucket, a base 23 is fixedly mounted (by welding or otherwise) on the upper outer surface of the bucket 13 adjacent its upper edge. A table 24 is mounted on the base 23 for pivotal movement about the said third axis C—C, a pivotal shaft being provided for that purpose. A hinge pin 25 is provided for connecting the lower end of the clamping arm 16 to the table 24 for pivotal movement about the second axis B—B. A first elongated link 26 is hingedly connected at one end to an intermediate point on the clamp arm. A second elongated link 27 is hingedly connected at one end to the table 24 at a point spaced rearwardly from the said second axis B—B. The other end of each of the first and second links 26 and 27 are pivotally connected together and to one end of the second hydraulic clamp cylinder 21.

The other end of the second hydraulic clamp cylinder 21 is connected to a point adjacent the upper end of the clamp arm 16. One end of the said first hydraulic storage cylinder 19 is hingedly connected to the table 24 at a point spaced from the said third axis C—C, while its other end is hingedly connected to the bucket at a point also substantially spaced from the said third axis.

Figure 6:
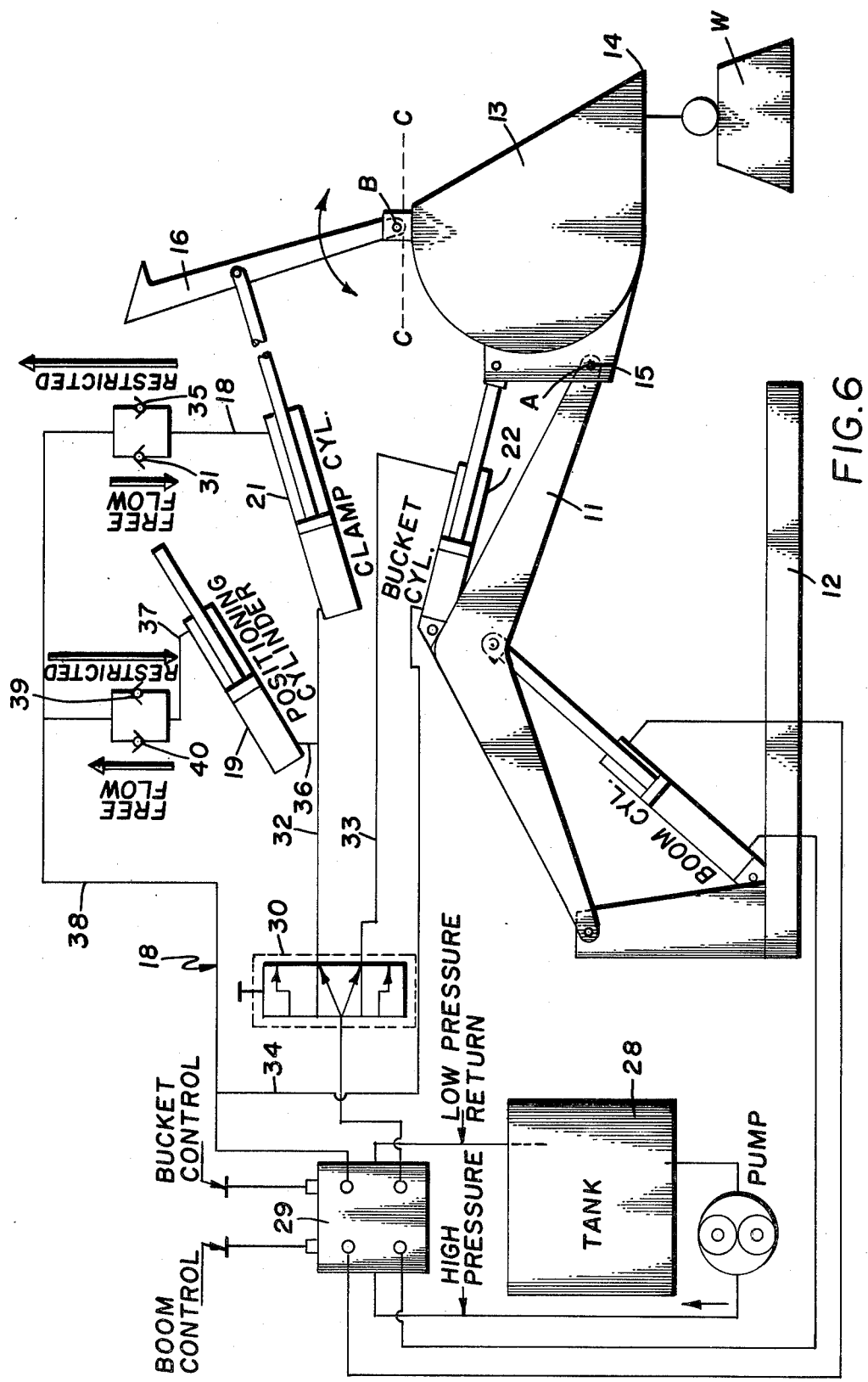
FIG. 6 is a hydraulic schematic of the circuitry used in the apparatus.

Referring to FIG. 6, which shows the details of the hydraulic circuit 18, it can be seen that the circuitry provides for substantial upward movement of the bucket 13 about the first axis A—A before the clamp arm 16 is allowed to move downwardly toward it. The clamp cylinder 21 which provides for pivotal movement about the second axis B—B also provides for the clamping force to be increases with the load W on the bucket in an amount which is in direct proportion to that load. Each of the first, second, and third hydraulic cylinders 19, 21, and 22 has a piston slidable in it and has a piston rod which extends from one end. A source 28 including a sump and a pump for providing hydraulic fluid under pressure is connected through a control valve 29 and a selector valve 30 to the cylinders. A conduit 32 connects the valve 30 to the head end of the clamp cylinder 21 for directing pressure fluid theret. A conduit 33 connects the valve 30 to the rod end of the bucket cylinder 22. The end of the clamp cylinder 21 which is connected to the clamp arm is the rod end; the end of the bucket cylinder, which is connected to the bucket, is also the rod end. A conduit 34 connects the rod end of the clamp cylinder 21 to the head end of the bucket cylinder 22. This last-named conduit 34 includes a check valve 31, which allows free flow of fluid from the bucket cylinder to the clamp cylinder. It also includes a check vlave 35 which presents a substantial, predetermined resistance to flow of fluid from the clamp cylinder to the bucket cylinder. A conduit 36 connects an intermediate portion of the conduit 32 to the head end of the storage cylinder 19, while a conduit 37 connects the rod end of the cylinder 19 to a drain conduit 38, the conduit 38 in turn leading from the conduit 34 to the control valve 29 and to the source 28 of pressure fluid. The conduit 37 contains a check valve 39 which allows free flow of fluid from the rod end of the cylinder to discharge and a check valve 40 which presents restricted flow from the conduit 38 to the rod end of the cylinder.

The operation of the apparatus will now be readily understood in view of the above description. When the vehicle motor is operating, the pump in the pressure fluid source 28 is operating and pressure fluid is available in the control circuit 18. The BOOM CONTROL plunger of the valve 29 permits the operator to manipulate the bucket boom. The BUCKET CONTROL plunger of the valve 29 directs pressure fluid to the selector valve 30. The valve 30 has a plunger which can be moved into one of three positions for Mode I, II, or III operation. In Mode I (shown in the drawing), fluid is available to all cylinders 19, 21, and 22. In Mode II, cylinders 19 and 21 receive fluid, while in Mode III only cylinder 22 receives fluid. The manipulation of the selector valve 30 to the Mode III position causes pressure fluid to appear either on the rod end or the head end of the bucket cylinder 22 under the direction of the BUCKET CONTROL lever of valve 29, thus causing the bucket 13 selectively to rotate clockwise or counterclockwise as desired about the first axis A—A. With Mode II the clamp arm 16 rotates about the axis B—B to move toward and away from the operating edge 14 of the bucket. In the Mode I position of the selector valve 30, both cylinders are operated. However, the connection of the conduits is such that the bucket 13 is caused to rotate under load in an upward direction until the hydraulic pressure in the bucket cylinder has risen sufficiently high to move the bucket under load before the clamp arm 16 is moved downwardly to meet it. This makes the circuit a "pressure priority" system, whereby the pressure in the bucket cylinder is allowed to rise sufficiently to raise the bucket before the clamp arm is allowed to move. At the same time, the force presented to the clamp arm by the cylinder 21 is in proportion to the force required to move the load W and is in direct proportion thereto. This taken into account the fact that, when the load material is heavy, the clamping force required to hold the material on the face of the bucket is usually also necessarily greater. In any case, it will be understood that once the selection of Mode I, II, or III has been made by the manipulation of the selector valve 30, the BUCKET CONTROL lever of the valve 29 is then used to move the cylinders for movement in one direction or the other, or for no movement at all.

It is interesting to note that, when the selector valve 30 is in the above-described Mode I (collective) position, the bucket moves first to lift, then the clamp moves down toward the bucket and clamps the load. Then, after the clamping pressure has risen to the desired value, all hydraulic fluid available then is used to rotate the bucket with its load, the clamping action being maintained during that bucket movement.

After the manipulation of the load by the bucket 13 and the clamp arm 16 has been completed, it may be desirable to store the clamp arm 16. This is done by bringing the clamp arm 16 to the vertical position and then operating the storage cylinder 19. The storage cylinder 19 moves the clamp arm 16 downwardly into the position shown in FIG. 4, wherein the clamp arm is stored adjacent the upper surface of the bucket and is well out of the way of the face of the bucket, so that the bucket can be operated without interference and independently, if desired. This storage position, of course, can take place for one of two reasons, i.e., either because it is desireable to move it out of the way in order to transport the vehicle, or because the bucket 13 is to be used by itself.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Material handling apparatus, comprising:
 (a) a frame adapted to be mounted on a vehicle,
 (b) a bucket mounted on the frame, the bucket having an operating edge,
 (c) pivot means mounting the bucket on the frame for pivotal movement about a first axis parallel to the operating edge,
 (d) a clamp arm pivotally mounted on the bucket for movement from a storage position in which the clamp arm extends along the outer surface of the bucket parallel to said operating edge and an operating position in which the clamp arm extends perpendicular to said operating edge,
 (e) means for moving the clamp arm about a second axis spaced from and parallel to said first pivotal axis when the clamp arm is in said operating position for movement toward said operating edge for clamping and away from said operating edge for unclamping, the pivotal movement of the clamp arm from said storage position to said operating position being about a third axis generally perpendicular to said first pivotal axis, and
 (f) storage means for moving the clamp arm from said operating position to said storage position.

2. Material handling apparatus as recited in claim 1, wherein the said storage means also moves the clamp arm from the said storage position to the said operating position.

3. Material handling apparatus as recited in claim 1, wherein hydraulic circuitry is provided to rotate the bucket about the said first axis and to rotate the clamp arm about the second said axis.

4. Material handling apparatus as recited in claim 3, wherein the hydraulic circuitry provides for upward movement of the bucket about the first axis before the clamp arm moves downwardly toward it about the second axis.

5. Material handling apparatus as recited in claim 4, wherein the clamping force increases with the load on the bucket in direct proportion thereto.

6. Material handling apparatus as recited in claim 5, wherein the storage means consists of a clamping hydraulic cylinder and a positioning hydraulic cylinder, the clamping hydraulic cylinder causing the clamp arm to rotate about the said second axis, the positioning hydraulic cylinder acting on the clamp arm to move it about said third axis and wherein a bucket hydraulic cylinder connects the frame to the bucket to bring about the pivotal movement of the bucket about the said first axis.

7. Material handling apparatus as recited in claim 6, wherein a base is fixedly mounted on the upper outer surface of the bucket, wherein a table is mounted on the base for pivotal movement about the said third axis, wherein a hinge pin is provided for connecting one end of the clamp arm to the table for pivotal movement about the said second axis, and wherein a first elongated link is hingedly connected at one end to the table at a point spaced from the said second axis, a second elongated link is hingedly connected at one end to the clamp arm at a point spaced from said second axis, the other end of each of the first and second links being pivotally connected together, to one end of the clamping hydraulic cylinder, and wherein the other end of the clamping hydraulic cylinder is connected to a point adjacent the other end of the clamp arm.

8. Material handling apparatus as recited in claim 7, wherein one end of the said positioning hydraulic cylinder is hingedly connected to the table at a point spaced from the said third axis and the other end is hingedly connected to the bucket at a point substantially spaced from the third axis.

9. Material handling apparatus as recited in claim 8, wherein each of the clamping, positioning, and bucket hydraulic cylinders has a piston slidable therein and a piston rod extending from one end, wherein a source of hydraulic pressure fluid is connected through a control valve and a selector valve to the cylinders, wherein a conduit connects the selector valve to the other end of the clamping cylinder for directing pressure fluid thereto, wherein a conduit connects the selector valve to the one end of the bucket cylinder, the rod of the clamping cylinder is connected to the clamp arm and the rod of the bucket cylinder is connected to the bucket, and wherein a conduit connects the one end of the clamping cylinder to the other end of the bucket cylinder, the last-named conduit including a check valve which allows free flow of fluid from the bucket cylinder to the clamping cylinder, but which presents a substantial resistance to flow of fluid from the clamping cylinder to the bucket cylinder.

10. Material handling apparatus as recited in claim 9, wherein a conduit connects the selector valve to the other end of the positioning cylinder, the one end of the positioning cylinder being connected by a control conduit to the conduit joining the bucket cylinder to the clamping cylinder, the said control conduit including a check valve presenting a resistance to flow away from the one end of the positioning cylinder and a check valve permitting free flow toward the positioning cylinder.

11. Material handling apparatus, comprising:
 (a) a frame adapted to be mounted on a vehicle,
 (b) a bucket mounted on the frame, the bucket having an operating edge,
 (c) pivot means mounting the bucket on the frame for pivotal movement about a first axis parallel to the operating edge,
 (d) a clamp arm mounted for rotating about a second axis spaced from and parallel to the said first pivotal axis,
 (e) storage means for moving the clamp arm from an operating position to a storage position along the outer surface of the bucket parallel to said operating edge and from said storage position to said operating position, and (f) hydraulic circuitry for rotating the bucket about said first axis and to rotate the clamp arm about said second axis toward and away from said operating edge, said circuitry providing for upward movement of the bucket about said first axis before the clamp arm moves toward said operating edge about said second axis, wherein the clamping force of said clamp arm increases with the load on the bucket in direct proportion thereto.

* * * * *